United States Patent [19]
Ritchey

[11] Patent Number: 6,145,225
[45] Date of Patent: Nov. 14, 2000

[54] ANIMAL EAR TAG ASSEMBLY AND COMPONENT LOCKING MEMBER

[76] Inventor: Eugene B. Ritchey, 13821 Sable Blvd., Brighton, Colo. 80601

[21] Appl. No.: 09/493,471

[22] Filed: Jan. 28, 2000

Related U.S. Application Data

[63] Continuation-in-part of application No. 09/109,832, Jul. 2, 1998, Pat. No. 6,055,752.

[51] Int. Cl.[7] .................................................. G09F 3/00
[52] U.S. Cl. .............................. 40/301; 40/300; 40/668; 606/116; 606/117
[58] Field of Search ............................ 40/300, 301, 668; 119/655; 606/116, 117

[56] References Cited

U.S. PATENT DOCUMENTS

| | | | |
|---|---|---|---|
| Re. 31,940 | 7/1985 | Ritchey | 119/156 |
| 630,349 | 8/1899 | Harvey . | |
| 982,896 | 1/1911 | Stoll | 40/301 |
| 2,625,760 | 1/1953 | Cleal | 40/668 |
| 3,214,856 | 11/1965 | Brierley | 40/301 |
| 3,526,987 | 9/1970 | McCarty et al. | 40/301 |
| 3,552,051 | 1/1971 | Ritchey | 40/301 |
| 3,595,201 | 7/1971 | Oudenhoven | 116/114 |
| 3,675,357 | 7/1972 | Magee | 40/300 |
| 3,731,414 | 5/1973 | Murphy et al. | 40/301 |
| 3,756,200 | 9/1973 | Ohlhausen | 119/156 |
| 3,826,030 | 7/1974 | Read | 40/301 |
| 3,949,708 | 4/1976 | Meeks | 119/156 |
| 4,021,952 | 5/1977 | Brierley | 40/301 |
| 4,059,074 | 11/1977 | Fürer et al. | 119/156 |
| 4,184,453 | 1/1980 | Ritchey | 119/156 |
| 4,209,924 | 7/1980 | Fearing | 40/301 |
| 4,250,643 | 2/1981 | Mackenzie | 40/301 |
| 4,425,874 | 1/1984 | Child | 119/156 |
| 4,471,546 | 9/1984 | Bolling, Jr. | 40/300 X |
| 4,506,630 | 3/1985 | Hair | 119/156 |
| 4,581,834 | 4/1986 | Zatkos et al. | 40/300 X |
| 4,597,208 | 7/1986 | Chevillot | 40/301 |
| 4,672,966 | 6/1987 | Hass, Jr. | 128/330 |
| 4,694,781 | 9/1987 | Howe et al. | 40/301 X |
| 4,718,697 | 1/1988 | Berardus van Amelsfort | 283/107 |
| 4,741,117 | 5/1988 | Fearing | 40/301 |
| 4,878,456 | 11/1989 | Howe | 40/300 X |
| 4,931,788 | 6/1990 | Creswick | 340/825.54 |
| 4,953,313 | 9/1990 | Scott | 40/301 |
| 4,958,452 | 9/1990 | Tate | 40/301 |
| 5,228,224 | 7/1993 | Gardner | 40/301 |
| 5,308,351 | 5/1994 | Nehls | 40/301 X |
| 5,357,700 | 10/1994 | Schulte | 40/300 X |

(List continued on next page.)

FOREIGN PATENT DOCUMENTS

| | | |
|---|---|---|
| 09300182 | 11/1994 | Belgium . |
| 0 407 853 A1 | 1/1991 | European Pat. Off. . |
| 154081 | 4/1932 | Switzerland . |
| 1097874 | 1/1968 | United Kingdom ..... 40/301 |
| 1187313 | 4/1970 | United Kingdom . |
| 2128938 | 5/1984 | United Kingdom ..... 40/301 |
| WO 91/10982 | 7/1991 | WIPO ..... 40/302 |
| WO 92/02127 | 2/1992 | WIPO . |
| WO 92/20221 | 11/1992 | WIPO . |

*Primary Examiner*—Lynne H. Browne
*Assistant Examiner*—Andrea Chop
*Attorney, Agent, or Firm*—Fields and Johnson, P.C.

[57] ABSTRACT

An animal ear tag includes a component locking member of novel design. The component locking member has an interior passageway which substantially conforms in shape to the post or pin of an ear tag installation tool to stabilize the connection therebetween which prevents slippage or other undesirable movement of the component locking member when installed on the ear of an animal. The component locking member is characterized by a transverse portion having a pair of opposed flanges, and a substantially planar rear edge. The planar edge is adapted for contact with an inner surface of a jaw of an installation tool which further provides stabilization between the component locking member and the ear tag installation tool. As an ear tag assembly, the invention utilizes the component locking member and an ear tag panel having a grommet which engages the component locking member.

14 Claims, 2 Drawing Sheets

U.S. PATENT DOCUMENTS

| | | | |
|---|---|---|---|
| 5,461,807 | 10/1995 | Johnson | 40/300 X |
| 5,473,830 | 12/1995 | Doble | 40/300 X |
| 5,482,008 | 1/1996 | Stafford et al. | 119/174 |
| 5,643,284 | 7/1997 | Hicks | 606/117 |
| 5,667,515 | 9/1997 | Chu | 40/300 X |
| 5,768,813 | 6/1998 | Reboul et al. | 40/301 |
| 6,055,752 | 5/2000 | Ritchey | 40/301 |

ANIMAL EAR TAG ASSEMBLY AND COMPONENT LOCKING MEMBER

This invention is a continuation-in-part application of U.S. Ser. No. 09/109,832, filed Jul. 2, 1998 and entitled "Ear Tag With Locking Member for Multi-Purpose Storage," now U.S. Pat. No. 6,055,752.

TECHNICAL FIELD

This invention relates to an ear tag and, more particularly, to a livestock identification device in the form of an ear tag assembly which has a component locking member of improved design which is structurally more stable for use in installation, and may be used with many types of ear tag panels

BACKGROUND ART

Livestock ear or identification tags have been commonly used to identify livestock for centuries. There are a great number of prior art devices which have been used in the past to secure an identification tag to livestock.

A very common design for livestock ear tags is the use of a two-piece tag assembly. The tag assembly will include an ear tag panel which includes indicia for identifying the particular animal, and a securing member or securing element which is disposed on the opposite side of the ear and locks the panel in place.

Plastic molded ear tags have become the most common found in the art, because of their relative ease in manufacturing. Both the ear tag panel and ear tag locking device can be molded at relatively low cost, and with molding materials which withstand the wear and tear of use. However, one disadvantage with many of the locking members which are made of a plastic molded material are that they are structurally insufficient when installed by common ear tag pliers or installation devices. That is, because the locking members are made of a plastic material, they are often not structurally strong enough to withstand the bending stresses induced upon them when engaged by the installation tool. Another disadvantage for locking members is that they are often a particular design which can only be used with a particular type of ear tag panel. Therefore, there is no "universal" locking member which may be used with a wide array of ear tag panels, nor which can be installed by many different types of ear tag installation tools. Therefore, there is a need for a structurally strong, yet simple and universal ear tag locking member which can withstand the stresses placed upon it when loaded into an installation tool.

One example of a prior art ear tag is U.S. Pat. No. 4,741,117. This tag includes a stud for piercing the ear of an animal, the stud shaft being made of a hard resilient material for extending through the ear, and the ear piercing tip also being of a hard resilient material attached to one end of the shaft. A retaining flange attaches to an opposite end of the stud, and also is made of a hard resilient material which extends outward from the shaft to prevent withdrawal of the stud from the animal's ear when installed. A second retaining flange of flexible material is attached to the first retaining flange so the flanges co-act to thereby reduce snagging of the animal's ear tag.

Another example of a prior art tag is Great Britain Patent No. 1,187,313. This invention discloses a pair of elliptically-shaped plate elements, one of which is provided with a dowel to be inserted through an orifice provided in the other plate element. The dowel is arranged centrally of the one plate elements and extends normal thereto. The tip of the dowel is in the form of a lance or arrow-shaped penetrating tip.

Yet another prior art device includes U.S. Pat. No. 4,209,924. This invention discloses a two-piece ear tag with the first piece having a first part with a flat portion containing an identifying indicia. The first part is connected to a second part also containing an identifying indicia by a severable section. The second part further includes an anchoring pin or locking member with a sharp tip for piercing the animal's ear and extending into locking engagement in an opening of the first part of the tag.

Yet another example of a prior art device includes the one shown in U.S. Pat. No. 4,958,452. This invention discloses an ear tag device including a rivet, a flexible base having rib-like reinforcement ramps, a panel for indicia, and an applicator tool. The flexible base allows the rivet and the panel to move forward when mounted through the ear, until the reinforcement ramps bend together which lock and stiffen the rivet preventing it from being pulled back through the animal's ear.

While the foregoing prior art may be adequate for its intended purposes, none teach or disclose the advantages of the invention as discussed below.

DISCLOSURE OF THE INVENTION

In accordance with the present invention, an animal ear tag is disclosed which includes a component locking member of novel design. In the preferred embodiment, the component locking member includes a transverse portion defined by a pair of opposed flanges. An inserting portion or shaft connects to the transverse portion and extends substantially perpendicular thereto. The free end of the shaft has a cutting tip which penetrates the animal's ear. A disk-shaped recess is formed in the transverse portion. A cylindrical opening extends along the interior of the shaft in communication with the disk-shaped recess. In combination, the disk-shaped recess and cylindrical opening substantially conform in shape for receiving a common post or rod from an ear tag installation tool. More specifically, the post of an ear tag installation tool is most commonly in the form of a stainless steel pin or post of cylindrical shape, slightly tapered, having a base section of larger diameter. The larger diameter base section fits snugly and in frictional engagement with the disk-shaped recess of the component locking member.

In the prior art, the locking members fail to engage the base section of the post which results in unwanted slop or movement of the locking member when loaded on the post of the ear tag installation tool. Because the locking member in the prior art is not sufficiently steadied or supported on the post, this can result in undesirable shifting or slippage of the locking member as it is inserted through the animal's ear, and can result in breakage or deformation of the tip of the locking member as it penetrates the animal's ear or can result in a wound of increased size in the animal's ear due to slippage of the locking member as it penetrates. Also, because of this slippage or movement of the locking member when loaded on the post of the installation tool, more force may need to be applied to the handles of the installation tool in order for the tip to penetrate the animal's ear. This increased amount of required force can further result in destruction of the animal's ear as the tag is being installed due to slippage or movement of the user's hands which operate the installation tool. With the disk-shaped recess within the locking member of the current invention, the locking member is provided substantial securing reinforcement when loaded on the post of the installation tool. This helps to eliminate any slop or displacement of the locking member as it penetrates the animal's ear and attaches to the ear tag panel.

Yet another advantage of the locking member of this invention is the transverse portion which includes the opposed flanges. The opposed flanges form a substantially planar rear surface which can be placed in abutment to the inner surface of a jaw of the installation tool. Thus, the flanges themselves also help to stabilize the locking member when loaded on the post of the installation tool.

Yet another advantage of the locking member of this invention is its ability to be used with the most common form of post used in ear tag installation tools. Although the actual construction of the ear installation tool may widely vary among manufacturers, the most common element of these ear installation tools is the type of post used. As discussed above, the inclusion of the disk-shaped recess in conjunction with the cylindrical opening allows the locking member of this invention to be used with posts which are used with many different types of ear tag installation tools.

Yet another advantage of the component locking member of this invention is its ability to be used with many types of ear tag panels. The particular panel member disclosed in the current invention comprises a body portion, a neck portion connected to the body portion, and a grommet which is attached to the neck portion. The body and neck are made of a relatively flexible material, while the grommet is made of a stiffer, but still slightly flexible material. The grommet includes an inner rim which defines an opening therethrough. In use, the panel member is loaded into the ear installation tool simultaneously with the locking member, and as the jaws of the tool are closed, the cutting tip is inserted through the opening of the panel whereby a back edge of the cutting tip engages the inner rim of the panel member. As described, the panel member is very similar to panel members which are commonly used in animal identification tags. The simple yet structurally enhanced design of the component locking member works well in combination with the panel member.

Yet another feature of the invention includes the use of an electronic transponder which may be sealed within one or both of the flanges of the locking member. As known in the art, electronic transponders are being used for animal identification wherein the transponders are secured to the ear of the animal. In the present invention, the component locking member may be made by a standard plastic molding process. An electronic transponder may be placed within a mold of the component locking member to be made. Thus, the electronic transponder may be encapsulated within the plastic material which flows into the mold and which becomes the locking member. The particular transponder used can be one which is already used in the art, comprising an antenna and a microchip arrangement. This transponder is capable of generating a unique signal which specifically identifies the animal tagged.

The specific materials which are ideal for use in the current invention include various hardnesses of polyurethane. The locking member would have the highest hardness, and the panel member would have the lowest hardness. In terms of the manufacturing procedures to make the components of the current invention, injection molding is preferred for the component locking member, while a two-step process is preferred for the grommet and panel. More specifically, the panel may first be made by a process of injection molding or extrusion. One particularly advantageous method is disclosed in my earlier patent, U.S. Pat. No. 5,840,228. Then, the grommet may be made and secured to the panel by placing the neck of the panel in a grommet mold, and then injection molding the grommet around the panel such that the grommet is formed and the panel, which acts as a substrate, melts onto the formed grommet. This melt-bonding of the grommet to the panel ensures outstanding bonding of the two elements.

Other advantages of this invention will become apparent from the review of the following description taken in conjunction with the accompanying drawings.

DETAILED DESCRIPTION OF THE DRAWINGS

Figure 1:
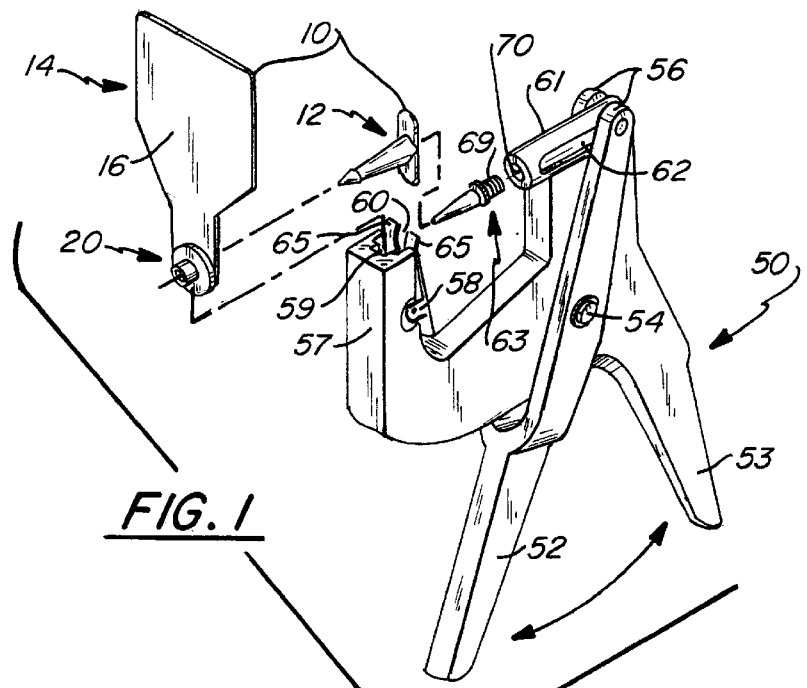
FIG. 1 is an exploded perspective view of an ear tag panel and component locking member comprising the ear tag assembly of this invention, and shows an ear tag installation tool which is similar to one manufactured and sold by Ytex of Cody, Wyo.
Figure 3:
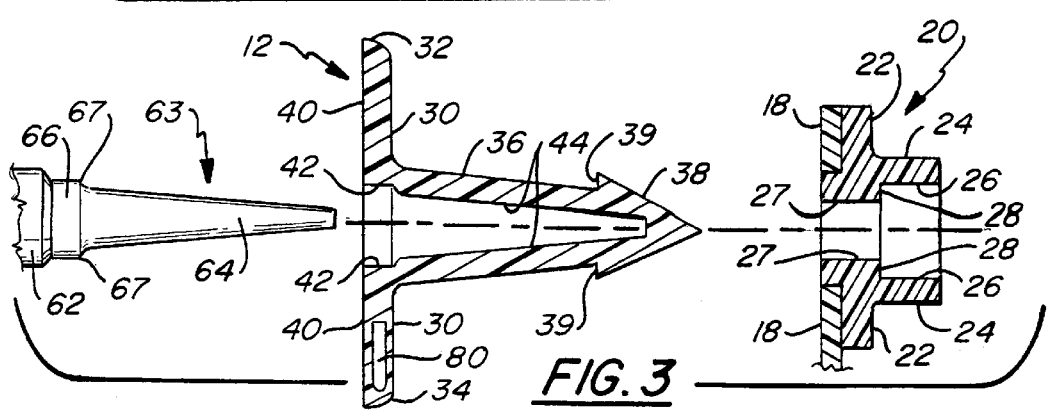
FIG. 3 is a greatly enlarged fragmentary vertical section taken along line 3—3 of FIG. 2 illustrating the interior details of the component locking member and the grommet of the ear tag panel.
Figure 4:
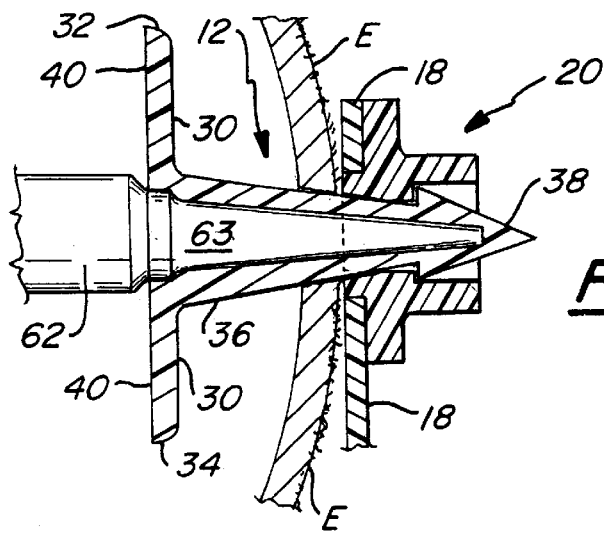
FIG. 4 is another greatly enlarged fragmentary vertical section such as shown in FIG. 3 illustrating the component locking member engaged with the grommet of the ear tag panel, and further showing a post of the ear tag installation tool engaged with the component locking member.
Figure 5:
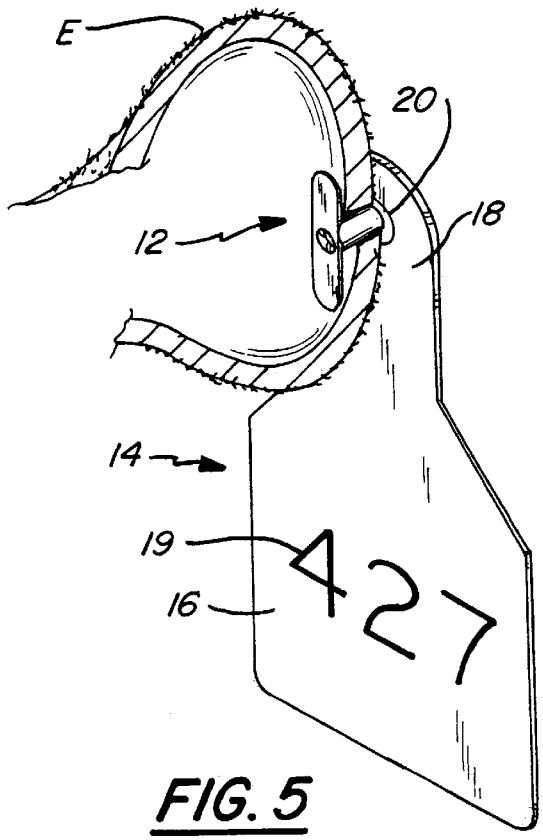
FIG. 5 is a perspective view of the ear tag assembly of this invention installed on the ear of an animal.

As shown in FIG. 1, the ear tag assembly 10 of this invention includes a component locking member 12, and an ear tag panel 14. The ear tag assembly 10 is shown in conjunction with a common ear tag installation tool/pliers 50. Beginning first with a description of the ear tag panel 14, it includes a body 16 of a desired shape, shown in FIG. 1 as substantially pentagonal. A neck 18 attaches to the panel 16. Indicia 19 may be placed on the body 16 in order to identify a particular tagged animal (FIG. 5). A grommet 20 is permanently affixed to an opening in the neck 18. As best seen in FIGS. 3 and 4, the grommet 20 includes a circular-shaped flange 22, and an integral extension 24 extending perpendicular from the flange 22. The extension 24 is cylindrical in shape and has an inner cylindrical surface 26 defining a first opening in the grommet. The opposite side or end of the grommet has a smaller opening defined by inner cylindrical surface 27. The smaller and larger openings communicate with one another along interior rim 28.

Figure 2:
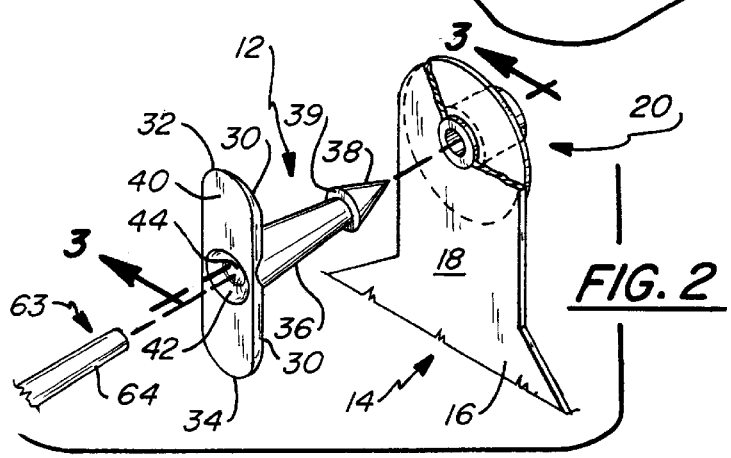
FIG. 2 is an enlarged fragmentary exploded perspective view of the component locking member prior to engagement with the grommet of the ear tag panel.

Now referring to FIG. 2, the component locking member 12 is characterized by a transverse portion 30 having a pair of opposed flanges 32 and 34, and an inserting portion 36 connected to said transverse 30 and extending perpendicularly thereto. The free or distal end of inserting portion/shaft 36 has a cutting tip 38 which pierces the animal's ear during installation of the ear tag assembly. As best seen in FIG. 4, the component locking member 12 is inserted through the smaller and larger openings in grommet 20 and the component locking member 12 is secured to the grommet 20 by engagement of the back edge 39 of cutting tip 38 with interior rim 28.

The rear edge of transverse portion 30 is characterized by a substantially planar surface 40. Referring now to FIG. 3, inner surface 42 defines a generally disk-shaped recess and communicates with the planar surface 40. Inner surface 42 is substantially perpendicular with respect to planar surface 40 thus defining the disk-shaped recess. Interior surface 44 defines a substantially cylindrical opening which extends longitudinally along inserting portion 36 and substantially the length thereof. Inner surface 42 extends longitudinally with respect to inserting portion 36, and inner surface 42 has a diameter larger than the largest diameter of the cylindrical opening. This cylindrical opening directly communicates with the disk-shaped recess formed by inner surface 42. The cylindrical opening may be slightly tapered in shape.

Referring back to FIG. 1, the ear tag installation tool 50 is an example of one well-known in the art, and commercially known as manufactured and sold by Ytex. This example of an installation tool 50 is characterized by a pair of handle members 52 and 53 which are activated in a scissor-like fashion wherein center pin 54 is the point of rotation about which the handle members rotate when squeezed together. Each of the handle members 52 and 53 have at their opposite ends corresponding jaws, shown as jaw 56 and jaw 57. A U-shaped base member 58 attaches to the jaw 57. A loading chamber 59 is defined by a hollowed out portion or recess in the jaw 57. A gap 60 exists between the prongs 65 in the U-shaped base 58, and communicates with the loading chamber 59. A post sleeve 61 extends in a direction toward the U-shaped base 58. The post sleeve 61 houses the post mount 62 which is a cylindrical-shaped member slidable within the post sleeve 61 in response to movement of the jaw 56 caused by the squeezing of the handle members 52 and 53. A post 63 attaches to post mount 62 and also extends in a direction toward U-shaped base 58.

It shall be understood that installation tool 50 is but one example of an ear tag installation tool which may be used with the ear tag assembly and component locking member of this invention. The ear tag installation tool is simply representative of the most common form of an ear tag installation tool wherein a pair of handle members are squeezed or activated to force a post or needle in a direction to pierce the animal's ear so as to force a locking member in engagement with an ear tag panel.

As best seen in FIGS. 1 and 3, the post 63 includes a needle portion 64 and a larger diameter base 66. The base 66 includes a shoulder 67 which transitions into the needle portion 64. The post 63 is mounted to post mount 62 by engaging threads 68 into threaded well 70 of post mount 62. Post 63 as illustrated herein is representative of the most common types of posts used.

In operation, the component locking member 12 is mounted over post 63. This is best seen in FIG. 4. The needle portion 64 of post 63 resides within the cylindrical opening formed by inner surface 44, and base 66 snugly engages inner surface 22. Referring back to FIG. 1, the grommet 20 is then inserted within loading chamber 59 such that cutting tip 38 is aligned with the large and small openings through grommet 20. The animal's ear is placed between cutting tip 38 and grommet 20. The handle members 52 and 53 are squeezed together forcing the cutting tip 38 through the tissue of the animal's ear. As best seen in FIG. 4, the cutting tip 38 continues to travel and is inserted through grommet 20. When fully inserted, the cutting tip 38 resides within the opening formed by inner cylindrical surface 26 and is prevented from being pulled back through the grommet by engagement of back edge 39 with rim 28. Grommet 20 may be made of a semi-flexible material which allows it to deform in order to accept the larger diametered cutting tip and inserting portion 36. The frictional engagement of inserting portion 36 with interior surface 27 further stabilizes the connection between component locking member 12 and ear tag panel 14. However, it shall be understood that inserting portion 36 can be sized to not cause deformation of inner surface 27 whereby back edge 39 of cutting tip 38 would be the only structural element which secures the component locking member 12 to the grommets 20.

As also shown in FIG. 3, an electronic transponder 80 may be encapsulated within one of the flanges 32/34. As discussed above, electronic means of livestock identification is becoming popular and the component locking member 12 is well suited for housing an electronic transponder. Because the transponder 80 is completely encapsulated, it can withstand the stresses of wear, and is not exposed to the elements.

Figure 6:
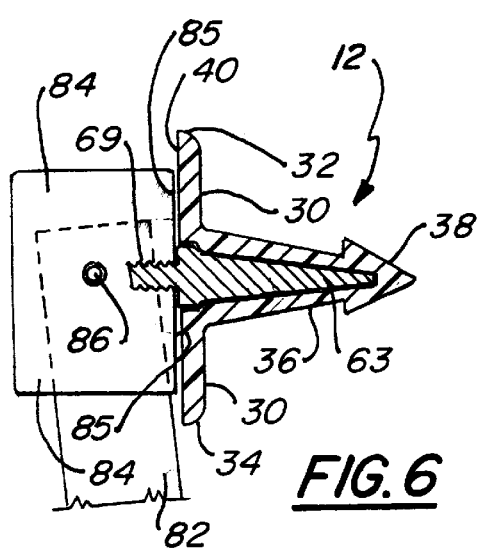
FIG. 6 is an enlarged fragmentary vertical section illustrating the component locking member of this invention mounted on another type of jaw of an ear tag installation tool.

FIG. 6 illustrates another example of an ear tag installation tool which may be used with the component locking member of this invention. As shown here, the ear tag installation tool includes a jaw 82 wherein the post 63 is mounted to jaw 82 by means of a rotatable head 84 rotatable about pin 86. The head 84 has a flat inner surface 85 which abuts the planar surface 40 of locking member 12. For ear tag installation tools of the type as shown in FIG. 6 which have such an inner flat surface 85, the planar surface 40 of locking member 12 also helps to stabilize the mounting of locking member 12 on post 63. That is, as shown in FIG. 6, planar surface 40 is in contact/close contact with inner surface 85 which prevents undesirable movement or rotation of the locking member 12 about post 63. Especially in those circumstances when the post 63 does not have a larger base 66, the planar surface 40 abutted against flat surface 85 helps to stabilize the engagement of the post 63 with the component locking member 12.

By the foregoing, it is apparent that the component locking member of this invention provides an improved design which enhances stability between the ear tag installation tool and the ear tag to be installed. The disk-shaped recess in communication with the cylindrical opening within the component locking member allows it to be snugly fastened to the most common posts used in ear tag installation tools. The substantially planar rear surface of the component locking member also to stabilize the connection between the post and the component locking member during installation of an ear tag. Furthermore, the component locking member of this invention is adapted for use with many types of ear tag panels commonly found in the art. In the present invention, the ear tag panel is shown as including a grommet portion. However, it shall be understood that the component locking member is capable of being used with any ear tag panel which simply has an opening for frictionally receiving the cutting tip 38. The ability to emplace an electronic transponder within the component locking member also makes the invention available for use with newer electronic tagging systems. Each of the components of the invention may be made of plastic materials which minimize manufacturing costs and efforts.

This invention has been described in detail with reference to a particular embodiment thereof, but it will be understood that various other modifications can be effected within the spirit and scope of this invention.

What is claimed is:

1. In subcombination, a component locking member for an ear tag comprising:

a shaft extending along a longitudinal axis and having a first end and a second end;

a cutting tip attached to said second end of said shaft for piercing an animal's ear; and a transverse portion attached to said first end of said shaft and extending substantially perpendicular thereto, said traverse portion having a rear edge, and a disk-shaped recess formed in said transverse portion at said rear edge, said disk-shaped recess defined by an inner surface extending substantially parallel to said longitudinal axis and a substantially cylindrical opening communicating with said disk-shaped recess and extending longitudinally within said shaft, said disk-shaped recess having a diameter larger than a diameter of said substantially cylindrical opening, said recess and said opening adapted to receive a post of an ear tag installation tool, said component locking member being made of a unitary one piece construction.

2. A subcombination, as claimed in claim 1, wherein:

said substantially cylindrical opening is tapered in shape to conform to the post of the ear tag installation tool.

3. A subcombination as claimed in claim 1, wherein:

said transverse portion comprises a pair of opposing flanges extending in opposite directions from one another.

4. A subcombination, as claimed in claim 1, wherein:

said transverse portion includes a rear planar surface.

5. A subcombination, as claimed in claim 1, wherein:

said component locking member is made of a substantially homogeneous material.

6. In combination, a component locking member for an ear tag, and a post of an ear tag installation tool comprising:

a shaft extending along a longitudinal axis and having a first end and a second end;

a cutting tip attached to said second end of said shaft for piercing an animal's ear;

a transverse portion attached to said first end of said shaft and extending substantially perpendicular thereto, said traverse portion having a rear edge, and a disk-shaped recess formed in said transverse portion at said rear edge, said disk-shaped recess defined by an inner surface extending substantially parallel to said longitudinal axis and a substantially cylindrical opening communicating with said disk-shaped recess and extending longitudinally within said shaft, said disk-shaped recess having a diameter larger than a diameter of said substantially cylindrical opening; and a post having a cylindrical needle portion, and an integral base portion supporting said needle portion, said base portion including a shoulder defining an exterior edge of said base portion, wherein said post is inserted within said recess and through said opening such that said shoulder of said post makes frictional engagement with said recess.

7. A combination, as claimed in claim 6, wherein:

said substantially cylindrical opening is tapered in shape to conform to said needle portion.

8. A combination, as claimed in claim 6, wherein:

said transverse portion comprises a pair of opposing flanges extending in opposite directions from one another.

9. A combination, as claimed in claim 6, wherein:

said transverse portion includes a rear planar surface.

10. A combination, as claimed in claim 6, wherein:

said component locking member is made of a substantially homogeneous material.

11. An ear tag comprising:

a shaft extending along a longitudinal axis and having a first end and a second end;

a cutting tip attached to said second end of said shaft for piercing an animal's ear;

a transverse portion attached to said first end of said shaft and extending substantially perpendicular thereto, said traverse portion having a rear edge, and a disk-shaped recess formed in said transverse portion at said rear edge, said disk-shaped recess defined by an inner surface extending substantially parallel to said longitudinal axis and a substantially cylindrical opening communicating with said disk-shaped recess and extending longitudinally within said shaft, said disk-shaped recess having a diameter larger than a diameter of said substantially cylindrical opening, said recess and said opening adapted to receive a post of an ear tag installation tool said component locking member being made of a unitary one piece construction; and a panel including a grommet attached thereto, said grommet being adapted for engagement with said cutting tip when the ear tag is installed on an animal's ear.

12. An ear tag, as claimed in claim 11, wherein:

said grommet includes an inner rim defining an opening through said grommet, and said cutting tip is inserted through said opening in said grommet and makes frictional engagement with said inner rim while being inserted therethrough.

13. An ear tag, as claimed in claim 12, wherein:

said cutting tip includes a back edge which engages said inner rim preventing said cutting tip from being pulled back through said opening in said grommet.

14. An ear tag, as claimed in claim 11, wherein:

said shaft, said cutting tip, and said transverse portion forming a component locking member, and said component locking member being made of substantially homogeneous material.

\* \* \* \* \*